Feb. 19, 1957 E. K. P. GRAHAM 2,781,568
FASTENING DEVICE
Filed Nov. 1, 1951
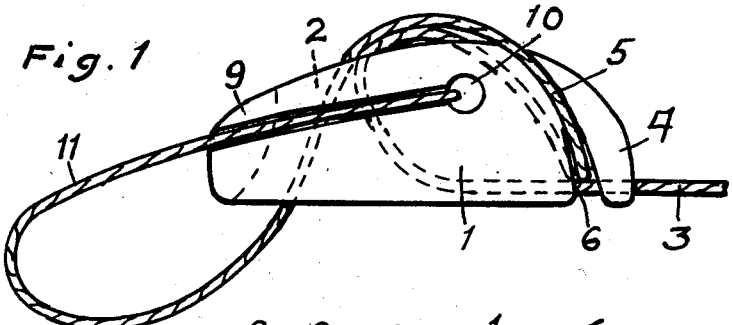
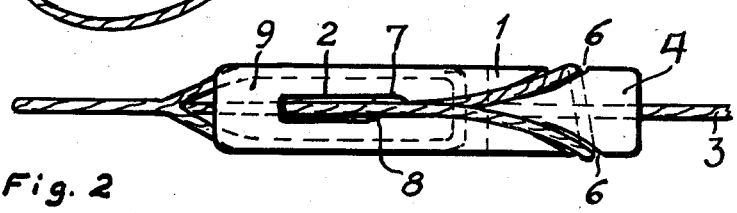
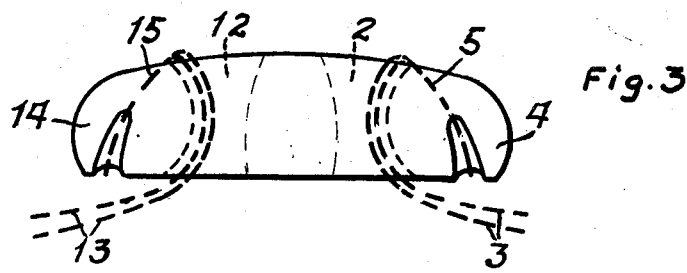
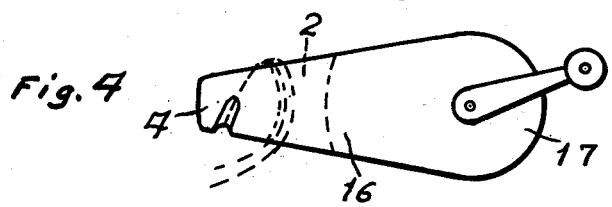
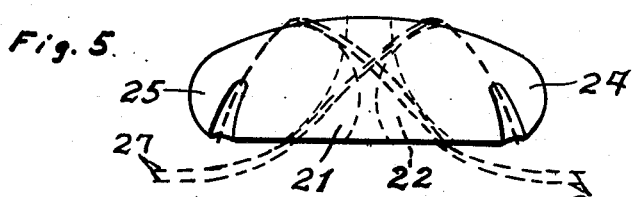
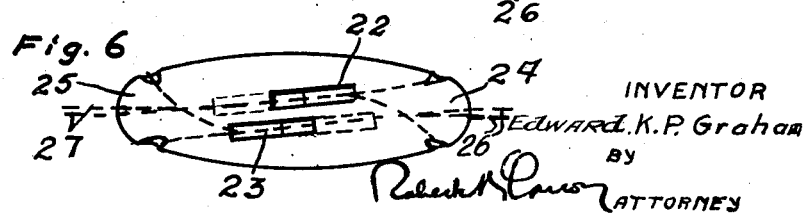
INVENTOR
Edward. K. P. Graham
BY
Robert N. Lawson
ATTORNEY

United States Patent Office 2,781,568
Patented Feb. 19, 1957

2,781,568

FASTENING DEVICE

Edward K. P. Graham, Stockholm, Sweden

Application November 1, 1951, Serial No. 254,250

2 Claims. (Cl. 24—129)

The present invention refers to a fastening device which is adapted for fastening ribbons, ropes, wires or the like, and, in particular, cables, to each other or to an object, so as to make a desired length of the cable available for the work in view. The fastening device is easily disconnectable or displaceable along the cable and no tools are required for performing these operations. Furthermore, it does not deform the cable.

To this end, the fastening device according to the invention comprises a slot extending through the device and adapted to accommodate a loop of a cable or the like, a first engaging member for the loop disposed laterally of said slot, and a second engaging member for engaging another object, such as a cable, or another portion of the same cable.

The invention is described with reference to some embodiments thereof shown by way of example in the drawing. Fig. 1 is a side view of a fastening device attached to a cable, Fig. 2 a plan view thereof. Figs. 3 and 4 are side views of modified fastening devices. Figs. 5 and 6 are different side views of yet another modified fastening device.

In the embodiment shown by Figs. 1 and 2 the device is in the shape of an elongated body 1 having in its middle a perforating slot 2 of oblong section, the length of the section exceeding double the diameter of a steel cable 3, with which the device is to connect, and the width thereof being less than the double of but not less than this diameter. The part of the body 1 lying to one side of the slot 2 is adapted to form an engaging member 4 for a loop 5 formed by the cable 3 and passed through the slot 2, the loop extending around the engaging member 4 and being guided by a guide groove 6. The wall of the slot 2 adjacent the engaging member 4 is provided with a pair of guide notches 7 and 8 for the parts of the loop 5, the notch 7 being somewhat displaced towards the member 4 with relation to the notch 8. The part of the body 1 lying to the other side of the slot 2 also forms an engaging member 9 for an end portion of the cable, which forms a loop passing through an aperture 10 in the body 1.

In the embodiment shown the fastening device is thus continually joined to the end of the cable 3. If the cable 3 is to be used, for instance, for a rescue operation, and is to be attached to a shaft, a tree, or the like, by means of a loop 11, which is not to be tightened around the shaft, the cable is first formed into a wide loop around the shaft and forms a portion thereof into a smaller loop 5, which is inserted into the slot 2 and is then brought around the engaging member 4 into the guide groove 6. When a pull is exerted on the right hand part, as viewed in Fig. 1, the loop 11 is also tautened and the cable portion extending therefrom into the slot is pressed against the portion extending towards the right hand part, which portion is thereby locked against lengthwise slipping of the loop 5 around the member 4, thereby also preventing tightening of the loop 11 around the shaft. The fastening device thus provides non-slideable attachment between one end portion of the cable 3 and the portion forming the loop 5. The notches 7 and 8 contribute to a right mutual positioning of the cable portions extending through the slot 2. The choice of the width of the slot 2 ensures that the parts will have the correct mutual alignment. The cable is not subject to harmful distortion. Further, it is of importance that the inserted cable is held by the fastening device which may be dropped down or laid aside without accidental loosening of the established connection. As soon as the pull on the cable has been slackened, the loop 5 can easily be taken off the member 4 and slid through the slot 2, thus disjoining the attachment. The contacting surface for the branch 3 of the slot 2 and on the outside of the body 1 may have a variable radius, the variation being so chosen as to provide a constant stress on the corresponding cable part.

In accordance with the modified embodiment shown in Fig. 3, the body 1 comprises, in addition to the slot 2, a similar slot 12 and an engaging member 14 adapted to engage a loop 15 of another cable 13. Thus, a pair of cables 3 and 13 may be fastened together by means of the present fastening device at any point of one of the cables. Alternatively, the Fig. 3 fastening device may be used to provide a loop 11 in one and the same cable, if an extra loop 5 is first formed and placed in position and then a second loop, spaced from the first, is fastened around the engaging member 14. The slot 12 and the member 14 thus replace the fixed attachment for the end of the cable 3 shown in Fig. 1.

As shown in Fig. 4, the device comprises a slot 2 and an engaging member 4 for the cable loop 5, as previously described, but in this case an engaging member 16 is disposed on the other side of the slot and is integral with a winch 17. The fastening device then makes it possible to attach securely and yet with the possibility of easy removal, when desirable, a cable to the winch.

In the embodiment shown in Figs. 5 and 6 the body 21 is provided with a pair of slots 22 and 23 arranged side by side and a pair of corresponding engaging members 24 and 25. In this case the slot 22 and the member 24 are associated with a loop in a cable 26 and the slot 23 and the member 25 with a loop in a cable 27, whereby the loops extend beyond each other, thereby exposing the portion of the body 21 between the members 24 and 25 essentially to a pure compression, to which it is less susceptible than to a pull. Also, in the embodiment of Figs. 1 and 2 the body is subject to a substantially pure compression.

The invention is not to be considered as being restricted to the embodiments shown and described, which are subject to variations within the spirit and scope of the invention. Specifically, the shape of the body portion may be varied, or the number of slots may be increased to provide accommodation for a greater number of cables.

What I claim is:

1. A fastening device comprising a body of oblong shape having a slot extending transversely therethrough, near one end thereof, said slot adapted to have a loop of flexible cord pass therethrough, said slot being of oblong section and having a width not less than the diameter of said cord and less than twice the diameter of said cord, said body including an engagement member lying at right angles to said slot, located at the side of said slot and adapted to receive the end of the loop after it has been passed through said slot, a surface between the slot and said engagement member, whereby, as a tension force is exerted on said cord, one loop part will be squeezed against said surface by the tension on another loop part, said body having at the end thereof opposite to said engagement member, a slot dimensioned similarly to said first mentioned slot extending through said device, and a second engagement member adapted to cooperate with a second loop portion of said cord.

2. A fastening device according to claim 1 in which said engagement members are so disposed as to cause the portions of said cord cooperating therewith to cross, whereby said device is exposed to substantially a pure compression.

References Cited in the file of this patent

UNITED STATES PATENTS

| | | |
|---|---|---|
| 879,941 | Botkin | Feb. 25, 1908 |
| 1,083,958 | Tod | Jan. 13, 1914 |
| 2,510,182 | Klingel | June 6, 1950 |